United States Patent
Krups et al.

(10) Patent No.: US 7,971,709 B2
(45) Date of Patent: Jul. 5, 2011

(54) WORKPIECE CARRIER SYSTEM AND FRICTION CONVEYOR

(75) Inventors: Peter Krups, Anhausen (DE); Matthias Krups, Vinxel (DE)

(73) Assignee: Ceratis GmbH (DE)

( * ) Notice: Subject to any disclaimer, the term of this patent is extended or adjusted under 35 U.S.C. 154(b) by 0 days.

(21) Appl. No.: 12/086,965

(22) PCT Filed: Sep. 18, 2007

(86) PCT No.: PCT/EP2007/059829
§ 371 (c)(1), (2), (4) Date: Jun. 23, 2008

(87) PCT Pub. No.: WO2008/037622
PCT Pub. Date: Apr. 3, 2008

(65) Prior Publication Data
US 2009/0178899 A1 Jul. 16, 2009

(30) Foreign Application Priority Data
Sep. 25, 2006 (DE) .................. 10 2006 045 575

(51) Int. Cl.
*B65G 17/12* (2006.01)
(52) U.S. Cl. .............. 198/867.13; 198/465.1; 198/479.1
(58) Field of Classification Search ............. 198/867.13, 198/465.1, 469.1, 479.1, 480.1, 803.2; 104/226, 104/140
See application file for complete search history.

(56) References Cited

U.S. PATENT DOCUMENTS

| | | | | |
|---|---|---|---|---|
| 3,824,930 A | | 7/1974 | Biessener | 104/172 BT |
| 4,576,277 A | * | 3/1986 | Park et al. | 198/867.13 |
| 5,368,152 A | | 11/1994 | Rhodes | 198/465.1 |
| 6,443,293 B2 | * | 9/2002 | Patrito | 198/465.1 |
| 7,219,793 B2 | * | 5/2007 | Robertsson et al. | 198/795 |

FOREIGN PATENT DOCUMENTS

| | | | |
|---|---|---|---|
| CH | 669167 | 2/1989 | |
| DE | 4036214 | 11/1991 | |
| GB | 601719 | 5/1948 | |
| GB | 1263298 | 2/1972 | |
| WO | WO9426637 A1 * | 11/1994 | 198/867.13 |

OTHER PUBLICATIONS

International Search Report and Written Opinion dated Dec. 13, 2007 based on PCT application No. PCT/EP2007/059829.

* cited by examiner

*Primary Examiner* — Mark A Deuble
(74) *Attorney, Agent, or Firm* — Ohlandt, Greeley, Ruggiero & Perle, LLP

(57) ABSTRACT

A workpiece carrier system for the loose support on a friction conveyor comprises a displacement element. The displacement element has a friction surface adjacent to drive elements, such as drive rollers of the friction conveyor for displacing the workpiece carrier system. The displacement element is connected with a carrier element for receiving a workpiece. Support elements are connected with the carrier element for absorbing part of the workpiece weight.

16 Claims, 7 Drawing Sheets

WORKPIECE CARRIER SYSTEM AND FRICTION CONVEYOR

BACKGROUND

1. Field of the Disclosure

The disclosure is directed to a workpiece carrier system loosely placed on a friction conveyor such as a roller conveyor, a belt conveyor or a plate conveyor. The disclosure is further directed to a friction conveyor that is particularly useful for conveying such workpiece carrier systems.

2. Discussion of the Background Art

Particularly in mass production, conveyor means are used to transport workpieces between individual workplaces where the workpieces are assembled or processed, for example. To do so, the workpieces are placed on workpiece carrier system and the workpiece carrier system is moved together with the workpieces by corresponding conveyor means. Friction conveyors are known for displacing the workpiece carrier system. With friction conveyors, the workpiece carrier system are not rigidly connected with the conveyor means, but may rest on rollers, for example. The displacement of the workpiece carrier system is effected through friction forces occurring between the rollers, belts or plates and friction surfaces of the workpiece carrier system. It is a particular advantage of friction conveyors that they allow for a back-up of the workpiece carrier system. Here, during the back-up process, the corresponding drive means of the friction conveyors slip. Friction conveyors require no intricate and complicated unlatching from a conveyor means, such as a chain. Another advantage of friction conveyors is that curves and especially branches can be realized in a simple manner. Using branching means, such as points, individual workpiece carrier system may be discharged or introduced, for example. Thus, friction conveyors have a great flexibility. Such a friction conveyor is described in DE 40 36 214.

If the workpieces are heavy workpieces, particularly weighing over 100 kg, and/or workpieces of large dimensions, friction conveyors have the drawback that unfavourable friction conditions occur especially in the area of curves and branches. The friction conditions occurring when workpiece carriers back up are disadvantageous as well. Another drawback of friction conveyors for large workpieces is that the conveyor paths have to be made very wide. This increases the costs of such friction conveyors.

It is an object of the disclosure to provide a workpiece carrier system that is particularly suited for receiving heavy and/or large workpieces. Further, it is an object of the disclosure to provide a friction conveyor for large and/or heavy workpieces, suitable in particular for the displacement of corresponding workpiece carrier system.

SUMMARY OF THE DISCLOSURE

The workpiece carrier system of the present disclosure is intended for loose placement on a friction conveyor, such as a roller conveyor, a belt conveyor or a plate conveyor. The workpiece carrier system is thus displaced by means of friction forces exerted by the friction conveyor on the workpiece carrier system. To achieve this, the workpiece carrier system comprises a displacement element resting on the friction conveyer by a friction surface. A carrier element is connected, preferably rigidly, with the especially plate-shaped displacement element. The carrier element is preferably also plate-shaped and serves to receive one or possibly a plurality of workpieces. According to the present disclosure, the carrier element is connected with support elements. At least part of the weight of the workpieces is absorbed via the support elements. According to the disclosure, the weight of the workpiece thus acts on the displacement element only in part, if at all. As provided by the disclosure, a part, preferably a substantial part, of the weight of the workpiece is absorbed or supported by the support elements. Preferably, more than 50%, especially more than 70% and, most preferred, more than 90% of the weight of the workpiece is absorbed by the at least one support element. The at least one support element connected with the carrier element transmits the weight force to an absorption element which may be a part of the friction conveyor, for example, but which preferably is not connected with the drive elements of the friction conveyor. The additional support elements provided by the disclosure so as to not transmit at least a part of the weight of the workpiece to the displacement element, are advantageous in that the friction conditions occurring between the friction surface of the displacement element and the drive elements of the friction conveyor are not negatively influenced.

Moreover, the separation of the workpiece carrier system into a displacement element and a carrier element, as provided by the disclosure, allows to design them with different dimensions. Thus, it is possible to connect a relatively small displacement element with a relatively large carrier element suitable for receiving workpieces of large dimensions. In particular, it is possible to provide a modular system wherein identical displacement elements are connected with different carrier elements, in particular carrier elements of different outer dimensions.

The preferably several support elements preferably are support elements with support rollers. At least a part of the weight force of the workpiece can be transmitted to a corresponding absorption element via the support rollers preferably situated on the bottom face of the carrier element. The absorption element may be a planar device forming a rolling track that may be provided independent of the drive elements of the friction conveyor. The arrangement and the geometric dimensions of the displacement element and the carrier element of a workpiece carrier system may preferably be selected such that the entire weight force of the workpiece is absorbed by the support elements. This is preferably effected through support elements with support rollers, the support rollers being pivotable about pivot axes in a particularly preferred embodiment. This guarantees that no undesired friction occurs between the support elements and the corresponding support surface and that the workpiece carrier system can smoothly be moved along curves.

In order to guarantee that the entire weight force or at least a substantial part of the weight force is absorbed by the support elements or that only a defined part of the weight force of the workpiece is transmitted to the displacement element, an interrupting element may be provided between the carrier element and the displacement element. For example, the interrupting element may be a damper element of elastic material, such as a spring or the like. A spring, which would then also serve as a press-on means, could guarantee, for example, that a defined pressure force is ensured between the friction surface of the displacement element and the drive elements of the friction conveyor. Even if the weight of the workpiece is increased, providing a interrupting element can prevent that the friction forces occurring between the friction surface and the friction conveyor increase.

In a particularly preferred embodiment, a support plane is spaced from a displacement element plane, the distance in particular being a horizontal distance. Here, the support plane is the plane in which the support regions or support points of the at least one support element are situated. Possibly, especially if a plurality of support elements are provided, these may be arranged in sets located in different support planes. The plane of the displacement element is the plane in which the displacement element, especially the friction surface of the displacement element, is located. Such a horizontal separation especially allows for providing a connection element between the displacement element and the carrier element. Here, the connection element may be web-shaped or columnar. This, in turn, is advantageous in that in the region of branches of the friction conveyor, i.e. in a region where the path of the support elements intersects the path of the displacement element, only a relatively narrow slot has to be provided for guiding the connection element therethrough. With the support elements, such as the support rollers, dimensioned correspondingly, the slot can readily be bridged or traveled over. Due to the support plane being spaced at a distance from the displacement element plane, it is easily possible to realize branches.

Preferably, the connection element is configured such that an articulated connection is formed between the displacement element and the carrier element. Thus, irregularities of the support element paths can be compensated for. Preferably, the above described interruption element is integrated with the connection element.

In a preferred embodiment of the workpiece carrier system of the disclosure, the displacement element is positioned centrally with respect to the carrier element. In particular, the displacement element is positioned symmetrically with respect to the center of gravity of the carrier element. It is particularly preferred to have the displacement element arranged on a line of symmetry of the carrier element, seen in the direction of transport of the workpiece carrier system. On either side of the carrier element, seen in the direction of transport, support elements are then arranged preferably symmetrically with respect to the displacement element.

In another embodiment of the workpiece carrier system according to the disclosure, the displacement element is positioned eccentrically with respect to the carrier element, especially on one side of the carrier element. In this embodiment, seen in the direction of transport, the displacement element is provided on one side of the carrier element and the at least one support element is provided on the other side. In this embodiment, a part—when the workpiece carrier is placed symmetrically, 50%—of the weight force of the workpiece is absorbed by the displacement element. Although this embodiment is limited with respect to the weight of the workpiece that can be absorbed, it still has the advantage that an opening may be provided especially in the central portion of the carrier element. This allows for an access to the workpiece from below through the opening for assembling or treating purposes.

Further, the disclosure refers to a friction conveyor, in particular a roller conveyor. The friction conveyor of the disclosure has substantial advantages, especially in combination with the above described workpiece carrier system.

The friction conveyor of the disclosure comprises a plurality of drive elements for the transmission of drive forces to a friction surface of a workpiece carrier system. With a roller conveyor, the drive elements are at least partly driven rollers. For example, the friction surface of the displacement element of the above described workpiece carrier system rests on the rollers, so that the workpiece carrier system is displaced due to friction forces. According to the disclosure, the friction conveyor has separate absorption elements, in addition to the drive elements, for absorbing at least a part of the weight force of the workpiece. By providing separate absorption elements, i.e. absorption elements especially spatially separated from the drive elements, transporting workpieces of great weight becomes possible, since the negative friction conditions caused by the great weight and otherwise occurring between the friction surface of the workpiece carrier and the drive elements are avoided. According to the disclosure, at least a part of the weight force is absorbed only by the absorption elements so that the force flow of this part is not directed via the drive elements. Further, the additional provision of absorption elements allows for a flexible design thereof and to define the position of the absorption elements independent of the position of the drive elements. A corresponding conveyor means can thus readily be adapted to different workpiece carrier system, e.g. workpiece carrier system of different widths. This would merely require another arrangement of the absorption elements, while the arrangement of the drive elements could possibly be maintained.

In a particularly preferred embodiment, the drive plane is spaced, in particular horizontally, from the support plane. Thus, a simple configuration of branches is possible. The drive plane is the plane in which the force transmission from the drive elements to the friction surface of the workpiece carrier system or the displacement element of the workpiece carrier system occurs. The support plane is the plane in which at least a part of the weight force of the workpiece is supported. When using the above described workpiece carrier system of the disclosure, the support plane corresponds to the plane in which the support portions or support points of the individual support elements are arranged. When support rollers are provided, the support plane thus is the plane in which the rollers roll.

Preferably, the friction conveyor has a cover element that is particularly arranged over the drive elements. This can reduce the soiling of the drive elements. The cover element preferably has an opening, such as a slot, extending in the direction of transport. When using the above described workpiece carrier system, the connection element between the displacement element and the carrier element protrudes through this slot.

BRIEF DESCRIPTION OF THE DRAWINGS

The following is a detailed description of preferred embodiments with respect to the accompanying drawings.

In the figures.

DETAILED DESCRIPTION OF THE PREFERRED EMBODIMENT

Figure 1:
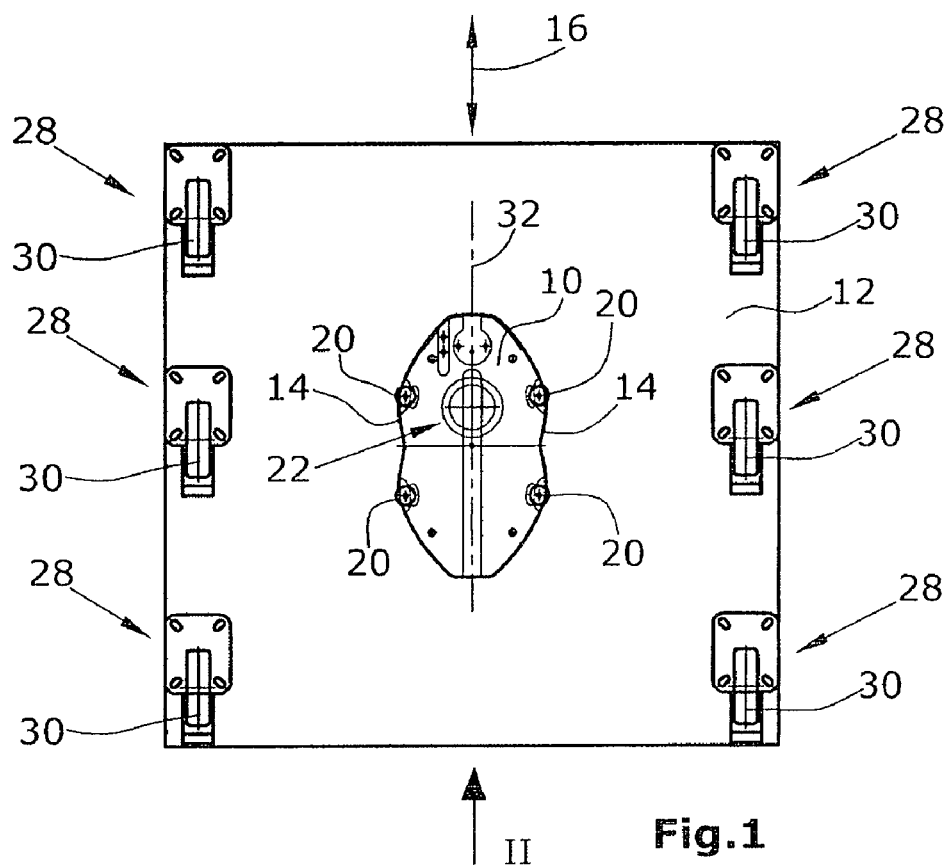
FIG. 1 is a schematic bottom view of a first preferred embodiment of the workpiece carrier system.
Figure 2:
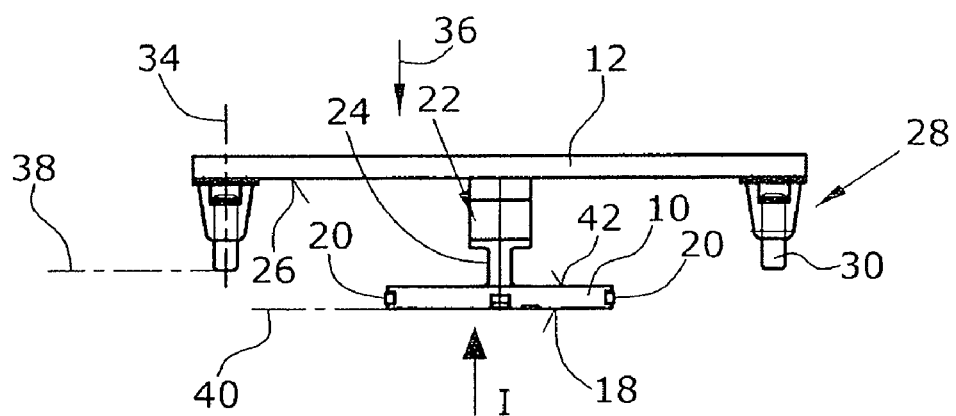
FIG. 2 is a schematic side elevational view of a first preferred embodiment of the workpiece carrier system, seen in the direction of the arrow II in FIG. 1.

The first embodiment of the workpiece carrier system of the disclosure, illustrated in FIGS. 1 and 2, has a displacement element 10, as well as a carrier element 12. The displacement element 10 has a substantially oval outer contour with curved recesses 14 in two opposite sides. The recesses 14 are located laterally with respect to the transport direction 16. Thereby, moving the displacement element along curves or branches is facilitated. The displacement element 10 has a planar bottom face 18 formed as a friction surface. When the workpiece carrier system is used together with a roller conveyor, the drive rollers contact the friction surface 18. Especially for a reduction of friction in curves and the like, the outer sides of the displacement element 10 can be provided with rollers 20 or similar sliding elements.

The displacement element 10 is connected with the carrier element 12 through a connection element 22. The connection element 22 is preferably web-shaped and has a taper at the end facing towards the displacement element, so that the connection element 22 is formed as a circular cylindrical web 24 in this region. In the part of the connection element 22 formed above the cylindrical web 24, a hinge (FIG. 9) may be provided for a hinged connection of the displacement element 10 with the carrier element 12. Further, in this region, a non-illustrated interruption element, such as a damping disc or the like, may be provided. Moreover, a spring or the like may be provided as a press-on means 25 (FIG. 9) in the connection element 22. Such a press-on means defines the friction force between the friction surface 18 and corresponding drive elements of the friction conveyor.

In the embodiment illustrated, six support elements 28 are arranged on a bottom face 26 of the especially plate-shaped carrier element 12, each comprising a support roller 30. The six support elements 28 are symmetric with respect to centre line 32 of the carrier element 12. In the embodiment depicted, the connection element 22 is also arranged symmetrically with respect to the centre line 32. The individual support rollers 30 are each pivotable about a pivot axis 34, so that the workpiece carrier system of the disclosure can be readily guided along curves.

Figure 10:
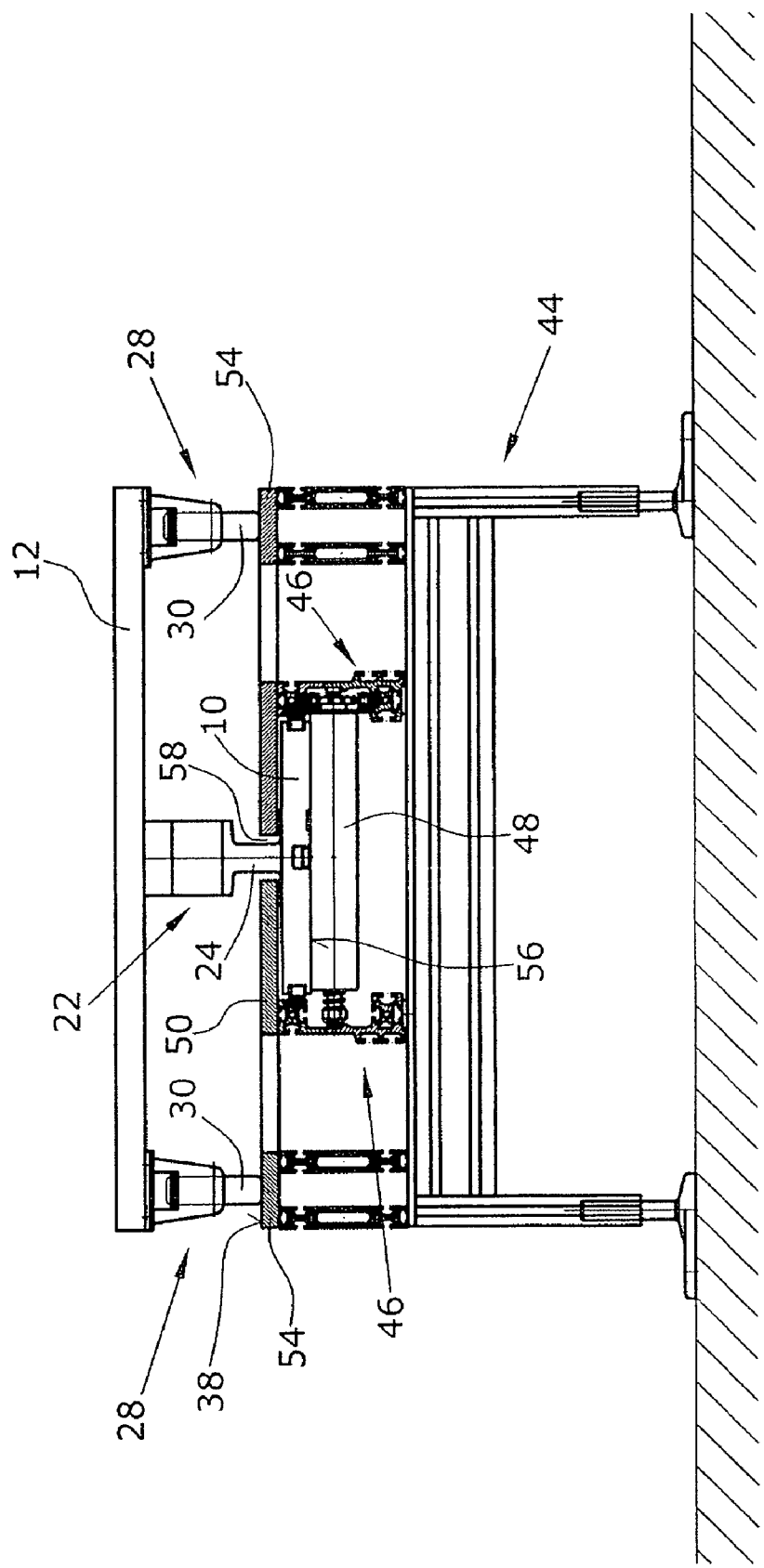
FIG. 10 is a schematic sectional view of a friction conveyor, especially useful for the displacement of workpiece carrier system as in FIGS. 1 and 2.

A support plane 38 extends perpendicular to a weight force acting in the direction of an arrow 36, which, in the embodiment illustrated, corresponds to the support means. The support plane 38 is the plane in which, in the embodiment shown, all six support points or support regions of the rollers 30 are arranged. Spaced horizontally from the support plane 38, the displacement element plane 40 is located, in which especially the friction surface 18 is provided, too. A top face 42 of the displacement element 10 is also spaced from the support plane 40. This is feasible, as will be explained in the following, for providing a cover element (FIG. 10). The web-shaped part 24 of the connection element 22 is situated in a slot in the cover element 50.

In the following embodiments, which are illustrated in FIGS. 3 to 8, similar and identical elements have been accorded the same reference numerals.

The second embodiment (FIGS. 3 and 4) substantially differs from the first embodiment in that, seen in the direction of transport 10, the displacement element 16 is provided on one side of the carrier element 12 and the support elements 28 are provided on the opposite side of the transport element 12. This is a clearly simpler structure, wherein a part of the weight force of the workpiece always has to be absorbed by the displacement element 10. This embodiment of the workpiece carrier system is particularly advantageous with conveyors where a certain type of curves, right or left turns, is more frequent. Here, the conveyor means may be structured such that the track on which the support rollers 30 run is more frequently situated on the inner side of the curve. Thus, the number of crossings of the track run on by the support rollers and the track of the displacement element is reduced.

Figure 5:
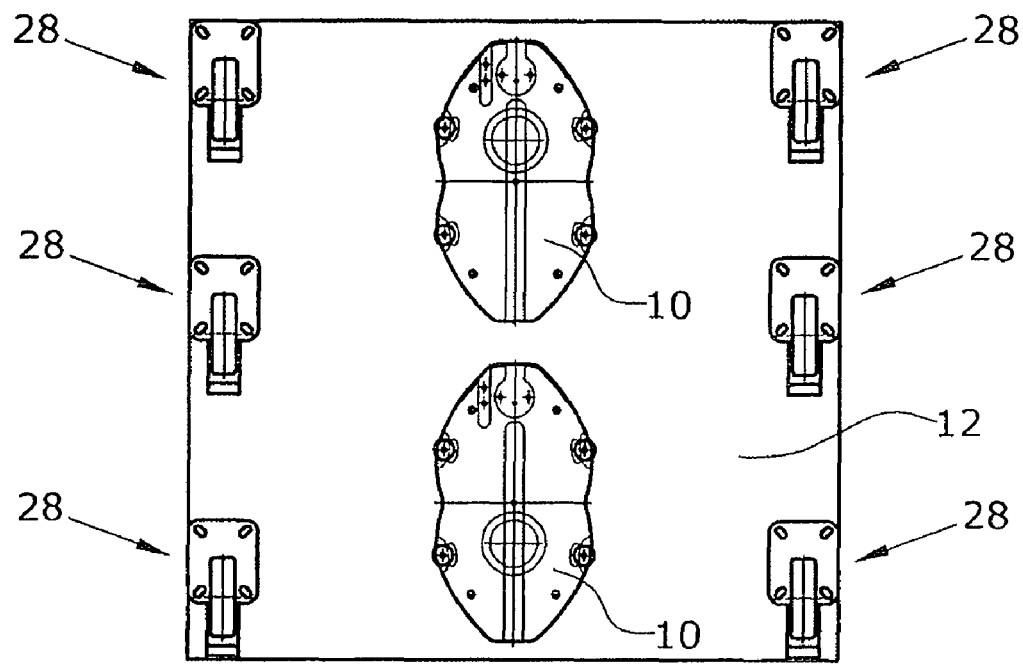
FIG. 5 is a schematic bottom view of a third preferred embodiment of the workpiece carrier system.
Figure 6:
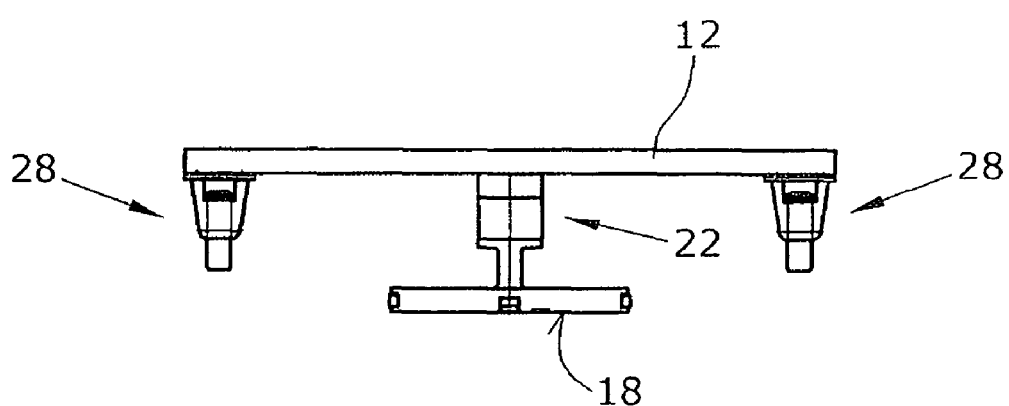
FIG. 6 is a schematic side elevational view of a third preferred embodiment of the workpiece carrier system, seen in the direction of the arrow II in FIG. 5.

The embodiment illustrated in FIGS. 5 and 6 corresponds to the embodiment illustrated in FIGS. 1 and 2, with the only difference that two displacement elements 10 are arranged one behind the other in the direction of displacement 16. Since the friction surface 18 is enlarged thereby, greater friction forces can be transmitted.

Figure 3:
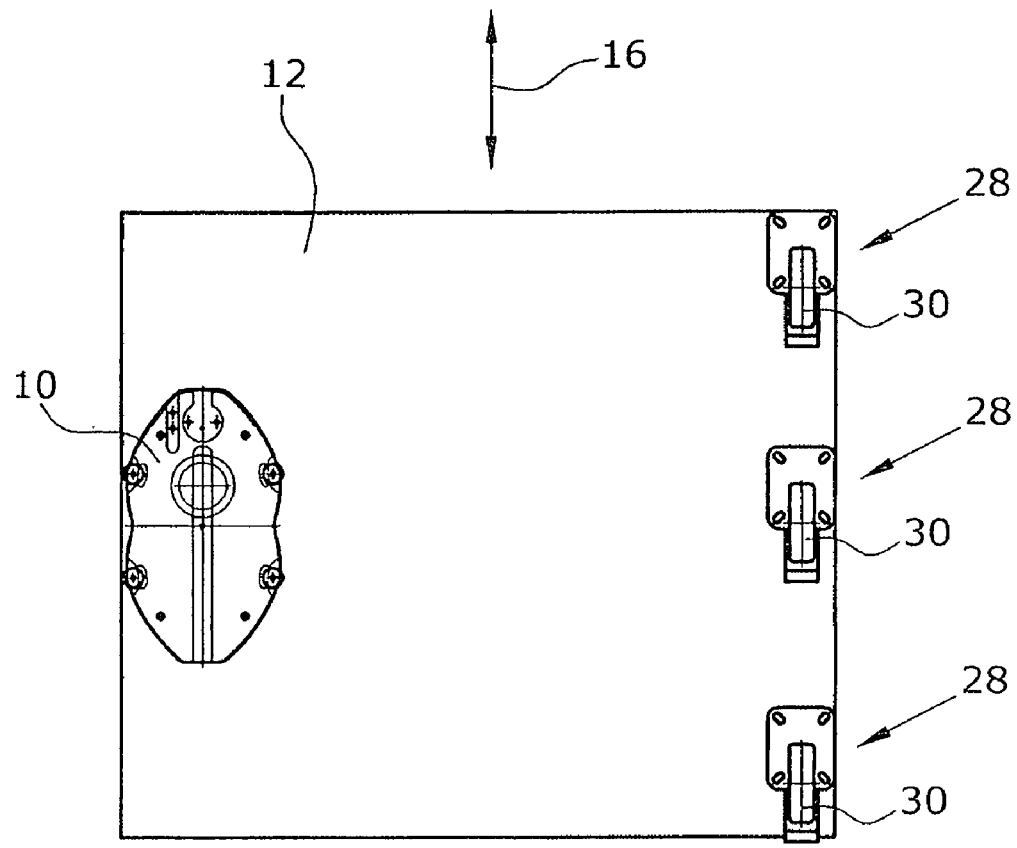
FIG. 3 is a schematic bottom view of a second preferred embodiment of the workpiece carrier system.
Figure 4:
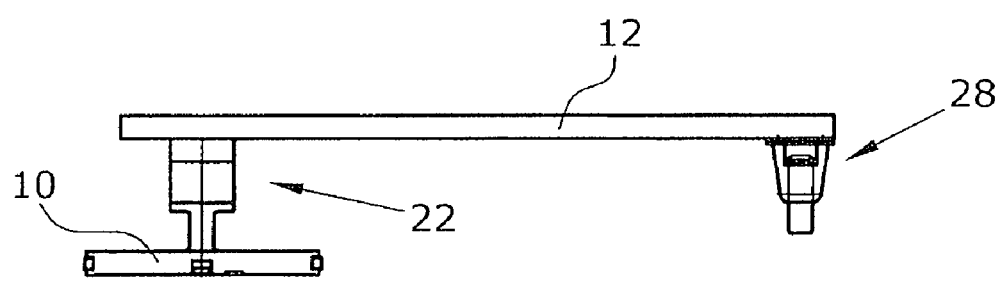
FIG. 4 is a schematic side elevational view of a second preferred embodiment of the workpiece carrier system, seen in the direction of the arrow II in FIG. 3.
Figure 7:
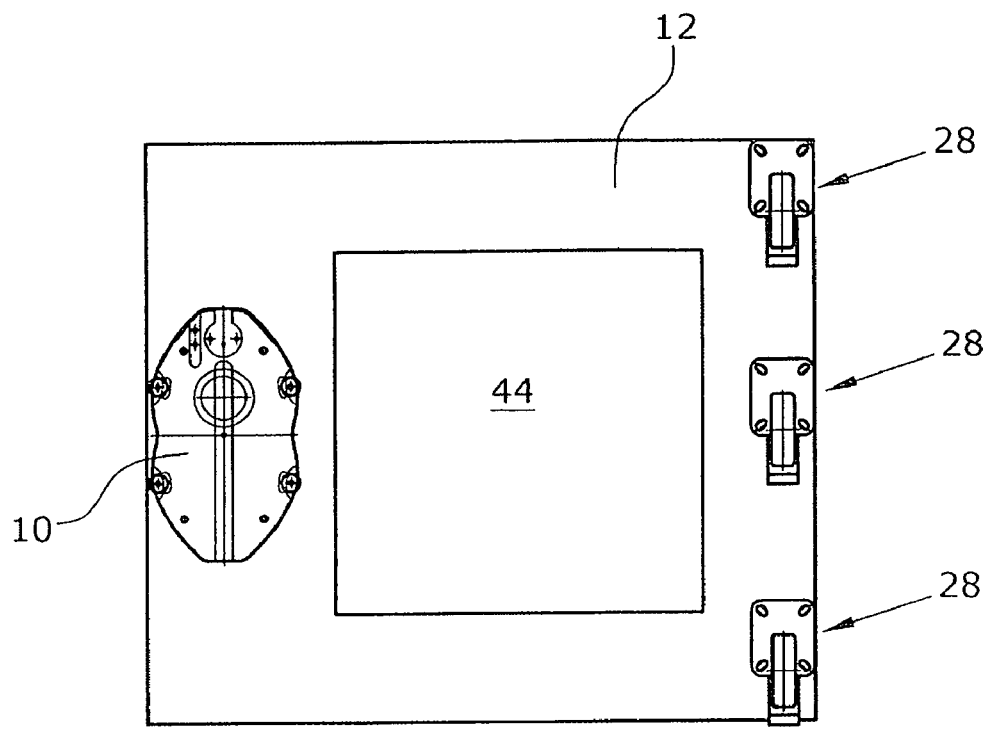
FIG. 7 is a schematic bottom view of a fourth preferred embodiment of the workpiece carrier system.
Figure 8:
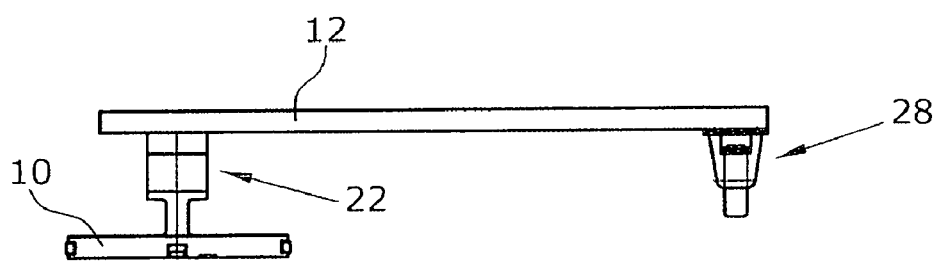
FIG. 8 is a schematic side elevational view of a fourth preferred embodiment of the workpiece carrier system, seen in the direction of the arrow II in FIG. 7.

The embodiment illustrated in FIGS. 7 and 8 of a workpiece carrier system corresponds to the embodiment illustrated in FIGS. 3 and 4, the carrier element 12 further having an opening 44 so that a workpiece placed on the carrier element 12 is also accessible from below.

It is an essential feature of all embodiments of the workpiece carrier system of the disclosure that the displacement element 10 is spaced, especially horizontally, from the carrier element 12. In the region of the displacement element, the workpiece carrier system thus preferably has a double-T-shaped cross section.

Figure 9:
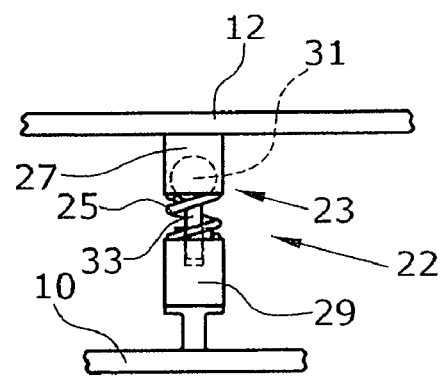
FIG. 9 is an enlarged schematic view of an embodiment of the connection element.

In the embodiments described above, the connection element 22 is preferably configured as illustrated in FIG. 9. The connection element 22 is of bipartite structure in the upper portion and has two cylindrical elements 27, 29. The upper cylindrical element 27 is rigidly connected with the carrier element 12 and comprises an especially spherical cavity in which a sphere 31 of the spherical joint 23 is located. The sphere 31 is connected with a rod 33 protruding into a cylindrical opening of the lower element 29, the rod being longitudinally displaceable therein. Moreover, the spring 25 is provided between the two elements 27, 29.

Figure 12:
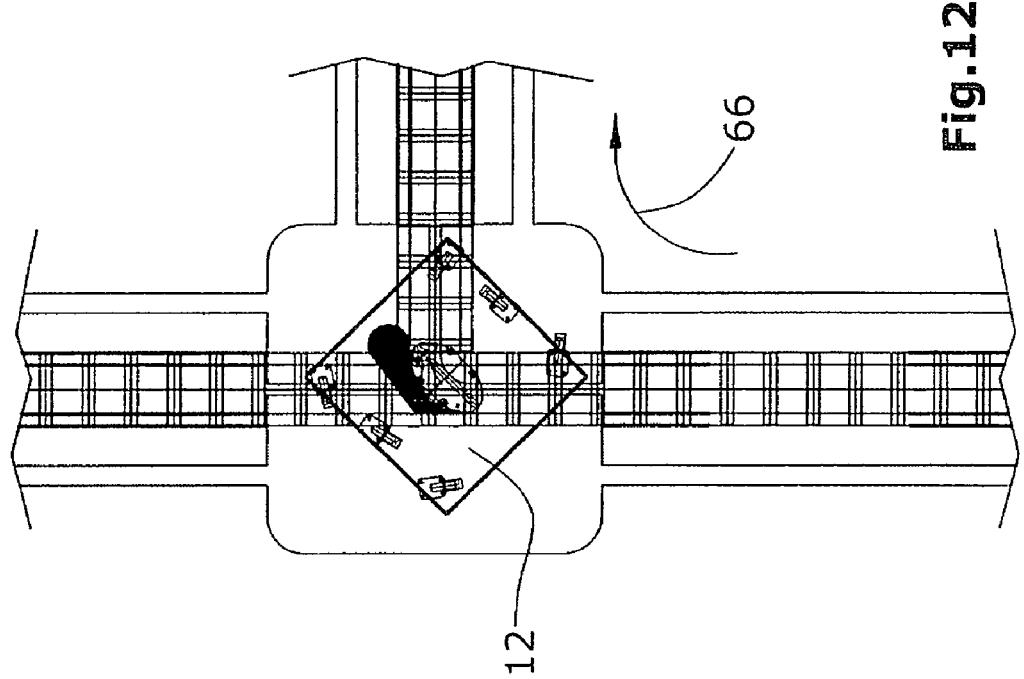
FIG. 12 is a schematic top plan view on the friction conveyor with a workpiece carrier system positioned in a branch.
Figure 11:
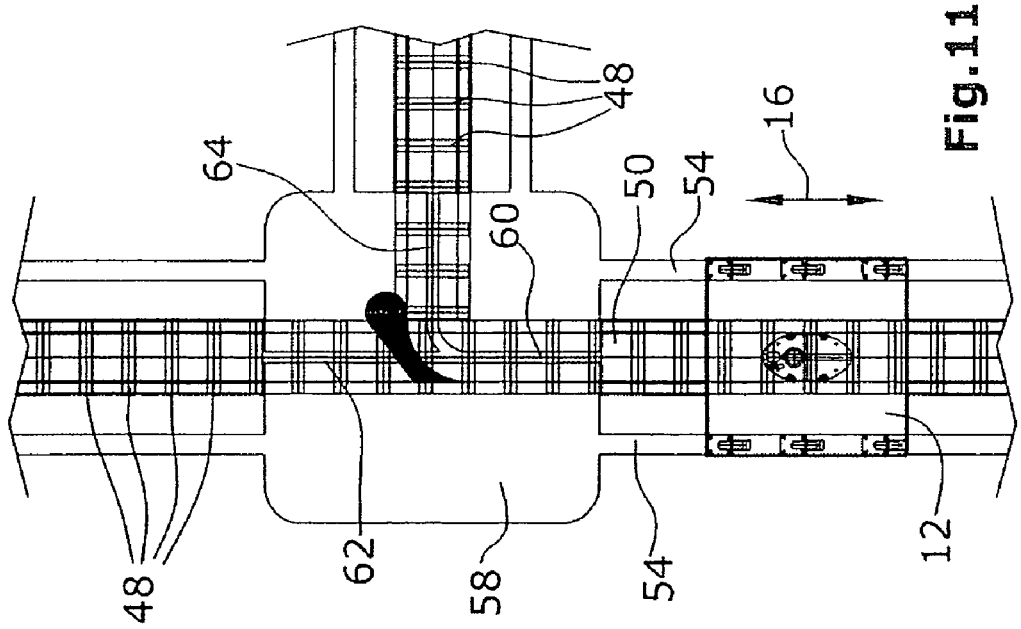
FIG. 11 is a schematic top plan view on the friction conveyor with a branch, illustrated in FIG. 10.

Referring to FIGS. 10 to 12, the following is a description of a roller conveyor of the disclosure suited for moving the workpiece carrier system illustrated in FIGS. 1 and 2. Frame-shaped carrier elements 46 are arranged on a particularly vertically adjustable base 44. The carrier elements 46 carry a plurality of rollers arranged one behind the other in the direction of transport 16 and serving as drive elements 48. The surface of the rollers 48 contacts the friction surface 18 of the displacement element 10. Due to the friction occurring between the drive rollers 48 and the friction surface 18, the displacement means 10 and thus the carrier elements 12 connected with the displacement means 10 via the connection element 22 are moved in the direction of movement 16. The rollers 48 are driven by gears, for example, or another drive means not illustrated. A cover element 50 is provided above the drive rollers 48.

The cover element 50 forms a space of a substantially rectangular cross section, in which the displacement element 10 is arranged. The displacement element 10 is thus situated between the drive elements 48 and the cover element 50. The cover element 50 serves to reduce the soiling of the drive elements 48.

The cover element 50 has a slot 52 extending in the transport direction 16, in which the cylindrical part 24 of the connection element 22 is arranged.

In the embodiment illustrated, a respective support element 54 is provided on either side of the drive elements 48 on the same level as the cover element 50. The support rollers 30 roll on the planar support element 54 formed as a rolling track.

In order to move the workpiece carrier system described with reference to FIGS. 1 and 2 with the friction conveyor represented in FIGS. 10 to 12, a horizontal distance is again provided between a drive plane and a support plane. The support plane 38 corresponds to the upper surface of the absorption elements 54. The drive plane corresponds to the upper surface 56 of the drive elements 48 and coincides with the friction surface 18 of the displacement element 10.

In the region of a branch, as it is illustrated in FIGS. 11 and 12, it is necessary that the track-shaped absorption elements pass into an enlarged surface which, in the embodiment illustrated, is a substantially square surface 58. Since the support elements 28 provided on the bottom face of the carrier element 12 have steering rollers freely rotatable about the pivot axis 34, the position of the rollers automatically adapts to the movement of the carrier elements 12 (FIG. 12). Since, in the preferred embodiment, the upper surface of the cover element 50 corresponds to the upper surface of the absorption elements 54, it is possible for the cover element 50 to possibly smoothly pass into the plane 58. The slot 52 intended for the passage of the web 24 is initially formed as the slot 60 in the plane 58, which is then either continued as a straight slot 62 or passes into a curve 64.

As is then evident especially from FIG. 12, the outer rollers 30 have to roll over the slot 62, when the carrier element 12 is moved along a curve in the direction of the arrow 66. This is readily possible, since the diameter of the rollers is significantly larger than the width of the slot.

Figure 13:
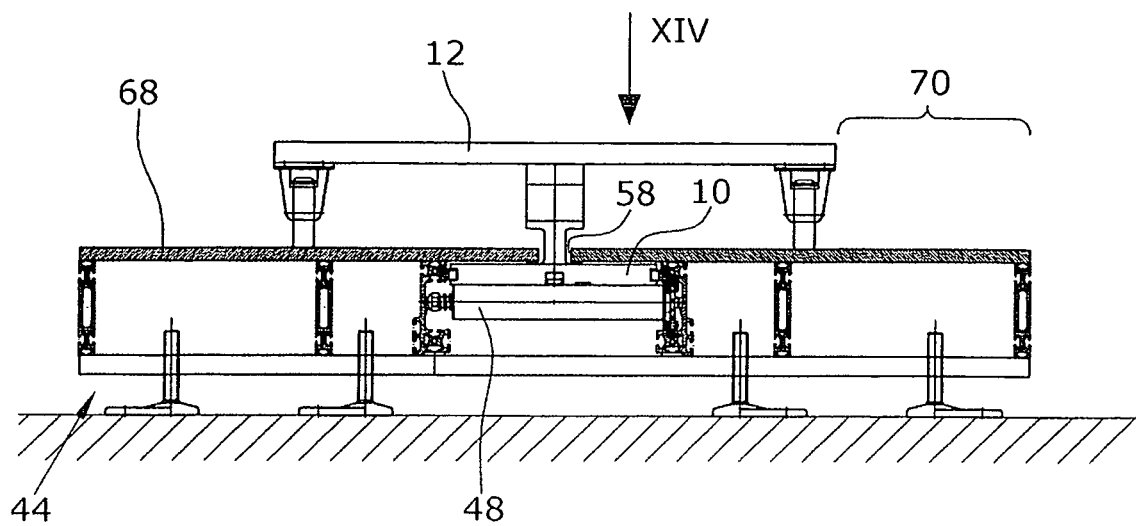
FIG. 13 is a schematic side elevational view of a further embodiment of a friction conveyor, which is particularly useful for the displacement of workpiece carriers illustrated in FIG. 1 or 2.
Figure 14:
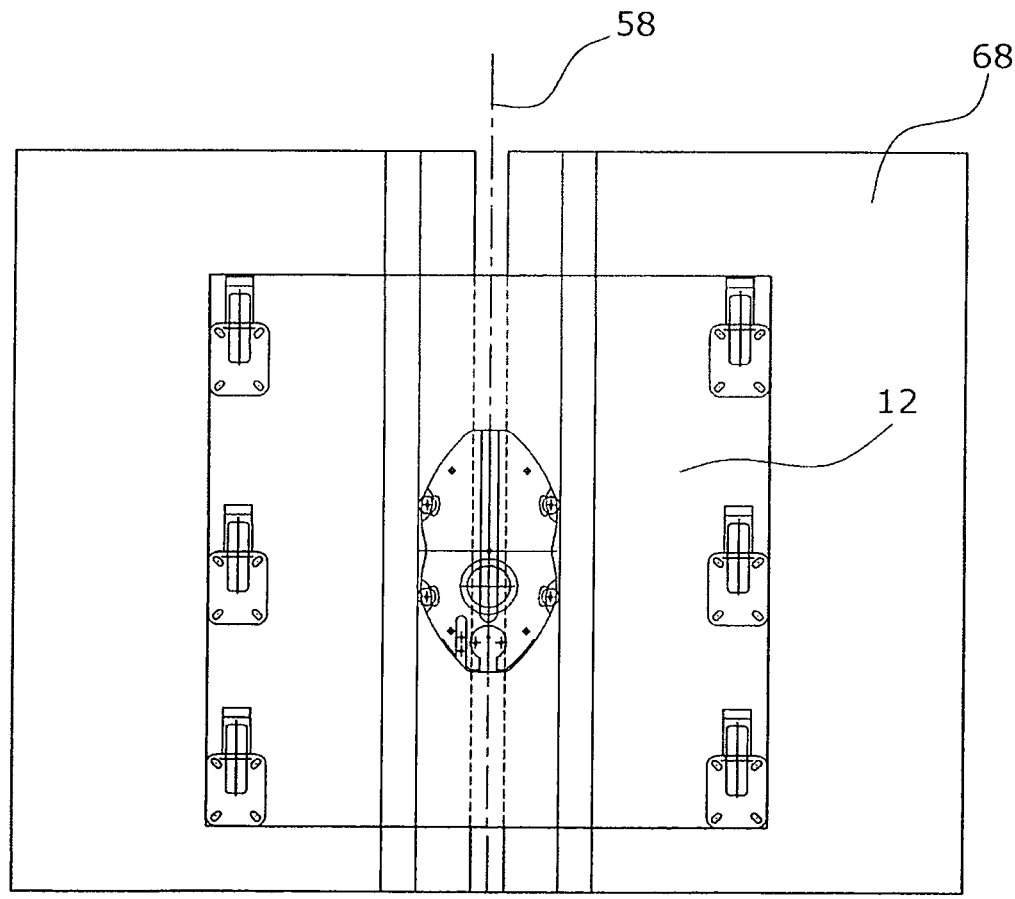
FIG. 14 is a schematic top plan view on the friction conveyor illustrated in FIG. 13.

FIGS. 13 and 14 illustrate another embodiment of the friction conveyor. This is of a structure similar to the friction conveyor described with respect to FIGS. 10 to 12. Similar or identical components are identified by the same reference numerals.

The essential difference between the friction conveyor illustrated in FIGS. 10 to 12 and the one illustrated in FIGS. 13 and 14 is that instead of a cover element 50 (FIG. 10) substantially covering only the drive elements 48, a continuous cover and support element 68 is provided. The element 68 thus serves both to cover the drive elements 48 and to further form the support elements corresponding to the support elements 54 in FIG. 10. The cover and support element 68 is a continuous plate with a slot 58. The advantage of a continuous element 68 is that the forces can be induced better into the frame 44. Further, it is possible that the element 68 protrudes laterally beyond the carrier element 12 so that a standing surface for persons is formed in an area 70.

What is claimed is:

1. A friction conveyor system, comprising:
   a friction conveyer having a plurality of drive elements; and
   a workpiece carrier system comprising:
      a displacement element having a friction surface in contact with the plurality of drive elements transmitting drive forces to the friction surface;
      a carrier element for receiving a workpiece and connected with the displacement element; and
      a plurality of support rollers that roll on a support element for absorbing at least a part of a weight of the workpiece, the plurality of support rollers contact the support element at a support plane, the plurality of support rollers each being connected with the carrier element and independent of the displacement element, the plurality of support rollers each being pivotable about a pivot axis extending in a direction substantially perpendicular to the support plane, wherein the friction conveyor has a curve and wherein the workpiece carrier system can rotate the carrier element 90 degrees along the curve.

2. The friction conveyor system of claim 1, wherein said plurality of support rollers are provided on a bottom face of the carrier element.

3. The friction conveyor system of claim 1, wherein said plurality of support rollers are arranged such that most of the weight of the workpiece is absorbed by the plurality of support rollers.

4. The friction conveyor system of claim 1, further comprising an interruption element arranged between the carrier element and the displacement element for reducing the weight force of the workpiece transmitted on the displacement element.

5. The friction conveyor system of claim 1, wherein said displacement element is connected with a press-on means for ensuring a pressure force between the friction surface and the friction conveyor.

6. The friction conveyor system of claim 1, wherein the support plane is spaced from a displacement element plane in which the displacement element is arranged.

7. The friction conveyor system of claim 1, wherein said displacement element is connected with the carrier element through a web-shaped connection element.

8. The friction conveyor system of claim 7, wherein said interruption element is integrated with the connection element.

9. The friction conveyor system of claim 7, wherein said connection element is hinged to the carrier element and/or the displacement element.

10. The friction conveyor system of claim 1, wherein said carrier element has an opening for access to the workpiece from below through the opening for treating the workpiece.

11. The friction conveyor system of claim 1, further comprising a drive plane, in which the force transmission to the friction surface occurs.

12. The friction conveyor system of claim 1, further comprising a cover element arranged above the drive elements.

13. The friction conveyor system of claim 1, further comprising a cover and absorption element serving to cover the drive elements and to form at least one absorbing element.

14. The friction conveyor system of claim 12, wherein said cover element or the cover and absorption element has an opening extending in the direction of transport and being intended for the passage of a connection element of the workpiece carrier system.

15. The friction conveyor system of claim 1, wherein the friction surface is further from the carrier element than a location where the plurality of support rollers contact the support element thereby a moving path of the plurality of support rollers can cross a moving path of the displacement element.

16. The friction conveyor system of claim 15, further comprising a cover arranged between the friction surface and the plurality of support rollers having a slot with the displacement element through the slot, and wherein the plurality of support rollers each have a diameter larger than a width of the slot so that the moving path of the plurality of support rollers can cross the moving path of the displacement element.

* * * * *